United States Patent
Hua et al.

(10) Patent No.: US 11,502,516 B2
(45) Date of Patent: Nov. 15, 2022

(54) POWER MANAGEMENT METHOD AND APPARATUS, COMPUTING DEVICE, MEDIUM, AND PRODUCT

(71) Applicant: Siemens Ltd., China, Beijing (CN)

(72) Inventors: Wen Tao Hua, Beijing (CN); Jing Li, Beijing (CN); Dan Wang, Chengdu (CN); Hao Liu, Beijing (CN); Ang Li, Beijing (CN)

(73) Assignee: SIEMENS LTD., CHINA, Beijing (CN)

( * ) Notice: Subject to any disclaimer, the term of this patent is extended or adjusted under 35 U.S.C. 154(b) by 0 days.

(21) Appl. No.: 17/612,650

(22) PCT Filed: May 22, 2019

(86) PCT No.: PCT/CN2019/088002
§ 371 (c)(1),
(2) Date: Nov. 19, 2021

(87) PCT Pub. No.: WO2020/232673
PCT Pub. Date: Nov. 26, 2020

(65) Prior Publication Data
US 2022/0255317 A1    Aug. 11, 2022

(51) Int. Cl.
*H02J 3/00* (2006.01)
*G05B 19/042* (2006.01)

(52) U.S. Cl.
CPC ............ *H02J 3/003* (2020.01); *G05B 19/042* (2013.01); *G05B 2219/2639* (2013.01); *H02J 2203/20* (2020.01)

(58) Field of Classification Search
CPC .... H02J 3/003; H02J 2203/20; G05B 19/042; G05B 2219/2639
See application file for complete search history.

(56) References Cited

U.S. PATENT DOCUMENTS

| | | | |
|---|---|---|---|
| 2005/0096797 A1* | 5/2005 | Matsubara | H02J 3/00 700/291 |
| 2009/0112522 A1* | 4/2009 | Rasmussen | G06F 1/26 702/186 |

(Continued)

FOREIGN PATENT DOCUMENTS

| | | |
|---|---|---|
| CN | 103123696 A | 5/2013 |
| CN | 105393422 A | 3/2016 |

(Continued)

OTHER PUBLICATIONS

International Search Report and Written Opinion dated Jan. 15, 2020.

*Primary Examiner* — Ziaul Karim
(74) *Attorney, Agent, or Firm* — Harness, Dickey & Pierce, P.L.C.

(57) ABSTRACT

The present disclosure relates to a power management method and apparatus, a computing device, a medium, and a product. The power management method includes a monitoring step, a prediction step, an error calculation step and an adjustment step including adjusting power supply plan or a power demand of a user when at least one of a first error is greater than a first predetermined threshold or a second error is greater than a second predetermined threshold.

19 Claims, 4 Drawing Sheets

(56) References Cited

U.S. PATENT DOCUMENTS

| | | | | |
|---|---|---|---|---|
| 2013/0127443 A1* | 5/2013 | Honjo | ................... | G06Q 50/06 |
| | | | | 324/103 R |
| 2014/0172503 A1* | 6/2014 | Hammerstrom | ....... | G05B 15/02 |
| | | | | 705/7.31 |
| 2014/0336960 A1* | 11/2014 | Haghighat-Kashani | ..................... | |
| | | | | G06Q 50/06 |
| | | | | 702/60 |
| 2015/0012147 A1* | 1/2015 | Haghighat-Kashani | ..................... | |
| | | | | G06Q 50/06 |
| | | | | 700/291 |
| 2015/0310461 A1* | 10/2015 | Lee | ........................ | G06Q 10/04 |
| | | | | 705/412 |
| 2016/0124450 A1* | 5/2016 | Kubota | ................ | G05B 13/026 |
| | | | | 700/291 |
| 2016/0305678 A1* | 10/2016 | Pavlovski | ................ | F24F 11/30 |

FOREIGN PATENT DOCUMENTS

| | | |
|---|---|---|
| CN | 106233321 A | 12/2016 |
| JP | 2006174654 A | 6/2006 |

\* cited by examiner

POWER MANAGEMENT METHOD AND APPARATUS, COMPUTING DEVICE, MEDIUM, AND PRODUCT

PRIORITY STATEMENT

This application is the national phase under 35 U.S.C. 371 of PCT International Application No. PCT/CN2019/088002 which has an International filing date of May 22, 2019, the entire contents of each of which are hereby incorporated herein by reference.

FIELD

The present application generally relates to the field of electric power, and in particular to a power management method and apparatus, a computing device, medium, and product.

BACKGROUND

Electrification is the general trend in today's world. Power consumption characteristics are variable, with, for example, new fluctuation characteristics and more complex time series characteristics, etc. The management of power consumption can be beneficial in many aspects. For example, it is an effective method for grid operators' power and energy optimization programs. In another aspect, it can help power retailers achieve more reliable transactions in the power market, and can identify the characteristics of end user power consumption to ensure their profits. In addition, it can help to identify potential value-adding services based on the power consumption characteristics of end users.

A power management system may comprise multiple parts. In prior art, these parts usually work independently instead of forming a closed-loop power management system.

SUMMARY

For the prediction part, the following three laws can be generally used to predict power consumption: the law of average growth rate, the law of seasonal coefficient, and the law of trend ratio. However, prediction at present is to use the power consumption data at a previously predicted time point to calculate the power consumption data at a future time point. It can be understood that the prediction data is not very reliable compared with the actual data during the prediction process. Therefore, the prediction data is comprised in the prediction leads to accumulation of errors.

In consideration of the above situation, it is necessary to provide a power management system that can manage power consumption more effectively and reliably.

A brief summary of the present invention is given below in order to provide a basic understanding of certain embodiments of the present invention. It should be understood that this is not an exhaustive summary of the present invention. It is not intended to define the key or important parts of the present invention, nor is it intended to limit the scope of the present invention. Its purpose is only to give some concepts in a simplified form as a prelude to the more detailed description that follows.

At least one example embodiment provides a power management method comprising a monitoring step including collecting and storing power consumption data of a user in real time, a prediction step including predicting first predicted power consumption of a first time period based on the collected power consumption data using a prestored first prediction model, and predicting, using a prestored second prediction model, second predicted power consumption of each second time period in the first time period, an error calculation step including sequentially performing, based on the collected real-time power consumption data, for each second time period from a first second time period to a last second time period in the first time period, calculating a first error between actual power consumption of the second time period and the second predicted power consumption of the second time period, and calculating a second error between total actual power consumption from the first second time period to a current second time period and a sum of second predicted power consumption from the first second time period to the current second time period and an adjustment step including adjusting a power supply plan or a power requirement of the user when at least one of (1) the first error is greater than a first predetermined threshold or (2) the second error is greater than a second predetermined threshold.

At least another example embodiment provides a computing device comprising at least one processor and a memory coupled to the at least one processor, the memory being configured to store an instruction that, when executed by the at least one processor, causes the processor to perform the method.

At least another example embodiment includes a non-transitory machine-readable storage medium storing an executable instruction that, when executed, causes a machine to perform the method.

At least another example embodiment computer program product tangibly stored in a computer readable medium and comprising a computer executable instruction that, when executed, causes at least one processor to perform the method.

At least another example embodiment provides a power management apparatus comprising a monitoring unit configured to collect and store power consumption data of a user in real time, a prediction unit configured to predict first predicted power consumption of a first time period based on the collected power consumption data using a prestored first prediction model, and predict, using a prestored second prediction model, second predicted power consumption of each second time period in the first time period, an error calculation unit configured to sequentially perform, based on the collected real-time power consumption data, the following processing from a first second time period to a last second time period in the first time period: calculating a first error between actual power consumption of the second time period and the second predicted power consumption of the second time period, and calculating a second error between total actual power consumption from the first second time period to a current second time period and a sum of second predicted power consumption from the first second time period to the current second time period, and an adjustment unit configured to adjust a power supply plan or a power requirement of the user when at least one of (1) the first error is greater than a first predetermined threshold or (2) the second error is greater than a second predetermined threshold.

At least another example embodiment provides a power management system including an interface unit configured to enable the power management system to obtain power consumption data from an external system, a database configured to store the power consumption data and the power management apparatus, wherein the power management apparatus obtains the power consumption data from the database.

In view of the above, the present disclosure proposes a power management method, apparatus and system for closed-loop power management. In the power management method according to the embodiments of the present disclosure, a full-time scale prediction method is adopted, which can improve the prediction accuracy and meet the real-time requirement for error tracking. By use of the results of error tracking, the power supply plan or a user's power demand can be adjusted appropriately to reduce the difference between the actual demand and the predicted demand, thereby improving the management of power consumption and increasing the efficiency of power consumption.

BRIEF DESCRIPTION OF THE DRAWINGS

With reference to the following description of the embodiments of the present invention in conjunction with the accompanying drawings, it will be easier to understand the above and other objectives, features and advantages of the present invention. The components in the drawings are only intended to illustrate the principle of the present invention. In the drawings, the same or similar technical features or components will be represented by the same or similar reference numerals.

REFERENCE NUMERALS IN THE DRAWINGS

Figure 1:
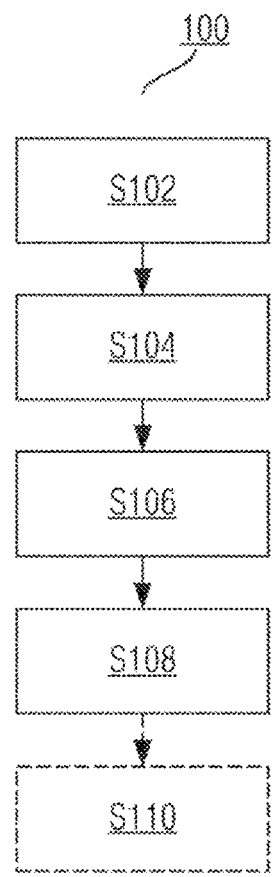
FIG. 1 is a flowchart of an exemplary process of the power management method 100 according to one embodiment of the present disclosure.

S102, S 104, S 106, S108 and S110: steps
200: power management apparatus
202: monitoring unit
204: prediction unit
206: error calculation unit
208: adjustment unit
210: post-evaluation unit
300: power management system
302: interface unit
304: database
310: external system
312: measuring system
314: local server
316: local database
400: computing device
402: processor
404: memory

DETAILED DESCRIPTION

According to one embodiment of the present disclosure, a power management method is provided, comprising a monitoring step including collecting and storing power consumption data of a user in real time; a prediction step including predicting first predicted power consumption of a first time period based on the collected power consumption data using a prestored first prediction model, and predicting, using a prestored second prediction model, second predicted power consumption of each second time period in the first time period; an error calculation step including sequentially performing, based on the collected real-time power consumption data, the following processing for each second time period from a first second time period to a last second time period in the first time period: calculating a first error between the actual power consumption in the second time period and the second predicted power consumption of the second time period, and calculating a second error between the total actual power consumption from the first second time period to a current second time period and a sum of the second predicted power consumptions from the first second time period to the current second time period; and an adjustment step including adjusting a power supply plan or a power demand of the user when at least one of (1) the first error is greater than a first predetermined threshold or (2) the second error is greater than a second predetermined threshold.

Optionally, in one example of the above embodiment, the method further comprises a post-evaluation step including calculating a third error between the actual power consumption in the first time period and the first predicted power consumption after the first time period ends, and separately adjusting the first prediction model and the second prediction model when the third error is greater than a third predetermined threshold.

In this way, the predicted power consumption and the actual power consumption can be analyzed, and the prediction model can be updated based on the analysis results to further improve the prediction accuracy.

Optionally, in one example of the above embodiment, the post-evaluation step further comprises: ranking different users based on the third error calculated for the users.

In this way, high-quality power users and the characteristics of different users can be easily identified, thereby improving the management of power users and increasing the efficiency of power consumption.

Optionally, in one example of the above embodiment, the first time period is one month, and the second time period is one day.

In this way, power consumption can be post-evaluated on a monthly basis.

Optionally, in one example of the above embodiment, the first prediction model is a first machine learning model obtained through training using historical power consumption data of the first time period as the training data, and the second prediction model is a second machine learning model obtained through training using historical power consumption data of the second time period as the training data.

In this way, the data at a previously predicted time point will not be used to predict the data at a future time point, thereby preventing the accumulation of errors in previously predicted data. Moreover, the prediction of daily power consumption can be constrained by the predicted monthly power consumption, thereby reducing the error between the predicted daily power consumption and monthly power consumption.

According to another example embodiment of the present disclosure, a power management apparatus is provided, comprising a monitoring unit, configured to collect and store power consumption data of a user in real time; a prediction unit (204), configured to predict first predicted power consumption of a first time period based on the collected power consumption data using a prestored first prediction model, and predict, using a prestored second prediction model, second predicted power consumption of each second time period in the first time period; an error calculation unit, configured to sequentially perform, based on the collected real-time power consumption data, the following processing for each second time period from a first second time period to a last second time period in the first time period, calculating a first error between the actual power consumption in the second time period and the second predicted power consumption of the second time period, and calculating a second error between the total actual power consumption from the first second time period to a current second time period and a sum of the second predicted power consumptions from the first second time period to the current second time period; and an adjustment unit, configured to adjust a power supply plan or a power demand of the user when at least one of (1) the first error is greater than a first predetermined threshold or (2) the second error is greater than a second predetermined threshold.

Optionally, in one example of the above embodiment, the power management apparatus further comprises a post-evaluation unit, configured to calculate a third error between the actual power consumption in the first time period and the first predicted power consumption after the first time period ends, and separately adjust the first prediction model and the second prediction model when the third error is greater than a third predetermined threshold.

Optionally, in one example of the above embodiment, the post-evaluation unit is further configured to: rank different users based on the third error calculated for the users.

According to another example embodiment of the present disclosure, a power management system is provided, comprising an interface unit, used to enable the power management system to obtain power consumption data from an external system; a database, used to store the power consumption data; and a power management apparatus described above, wherein the power management apparatus obtains the power consumption data from the database.

According to another example embodiment of the present disclosure, a computing device is provided, comprising at least one processor; and a memory coupled to the at least one processor, wherein the memory is used to store an instruction that, when executed by the at least one processor, causes the processor to perform the method described above.

According to another example embodiment of the present disclosure, a non-transitory machine-readable medium is provided, which stores an executable instruction that, when executed, causes a machine to perform the method described above.

According to another example embodiment of the present disclosure, a computer program product is provided, which is tangibly stored in a computer readable medium and comprises a computer executable instruction that, when executed, causes at least one processor to perform the method described above.

The subject described herein will now be discussed with reference to some exemplary implementations. It should be understood that the discussion of these implementations is only intended to enable those skilled in the art to better understand and realize the subject described herein, and is not intended to limit the scope, applicability, or examples set forth in the claims. The functions and arrangement of the discussed elements may be changed without departing from the scope of the present disclosure. Various processes or components may be deleted, replaced or added in each example as needed. For example, the method described herein may be executed in a sequence different from the described sequence, and various steps may be added, omitted, or combined. In addition, the features described in relation to some examples may also be combined in other examples.

As used herein, the term "comprising" and its variations is an open term that means "including but not limited to". The term "based on" means "at least partially based on". The term "one embodiment" or "an embodiment" means "at least one embodiment". The term "another embodiment" means "at least one other embodiment". The term "first", "second", etc. may refer to different or the same objects. Other definitions, either explicit or implicit, may be included below. Unless clearly indicated in the context, the definition of a term is consistent throughout the description.

The present disclosure discloses a power management method, apparatus and system for closed-loop power management. In the power management method according to the embodiments of the present disclosure, a full-time scale prediction method is adopted, which can improve the prediction accuracy and meet the real-time requirement for error tracking. By use of the results of error tracking, the power supply plan or a user's power demand can be adjusted appropriately to reduce the difference between the actual demand and the predicted demand, thereby improving the management of power consumption and increasing the efficiency of power consumption.

The power management method, device and system according to the embodiments of the present disclosure will be described below with reference to the accompanying drawings.

FIG. 1 is a flowchart of an exemplary process of the power management method 100 according to one embodiment of the present disclosure.

In FIG. 1, the monitoring step S102 is firstly executed to collect and store power consumption data of a user in real time.

The collected power consumption data may be exported in a certain file format (for example, Excel or .txt), or monitored through a console.

Next, the prediction step S104 is executed, wherein first predicted power consumption of a first time period is predicted based on the collected power consumption data by use of a prestored first prediction model, and second predicted power consumption of each second time period comprised in the first time period is predicted by use of a prestored second prediction model.

Wherein, the first prediction model is a first machine learning model obtained through training using historical power consumption data of the first time period as the training data; and the second prediction model is a second machine learning model obtained through training using historical power consumption data of the second time period as the training data.

In order to improve the prediction accuracy, a full-time scale prediction method is adopted in the power management method of one embodiment according to the present disclosure.

In one embodiment, the first time period is one month, and the second time period is one day.

Specifically, in step S104, power consumption in one month is firstly predicted, and then power consumption in each day of the month is predicted all at once. In this case, the data at a previously predicted time point will not be used to predict the data at a future time point, thereby preventing the accumulation of errors in previously predicted data. Moreover, the prediction of daily power consumption can be constrained by the predicted monthly power consumption, thereby reducing the error between the predicted daily power consumption and monthly power consumption.

Those skilled in the art can understand that the first time period may also be, for example, two months or one year, and the second time period may also be one week or one month, etc. As long as the first time period comprises a plurality of the second time periods, they are not limited to one month and one day as defined in this embodiment.

In one example, historical data of monthly power consumption may be used as the training data, and monthly power consumption (the first predicted power consumption) may be predicted by training the first machine learning model by use of the linear regression algorithm. Historical data of daily power consumption may be used as the training data, and daily power consumption (the second predicted power consumption) may be predicted by training a neural network model, for example, RNN (recurrent neural network), as the second machine learning model.

Those skilled in the art can understand the specific process of obtaining the first machine learning model and the second machine learning model through training and predicting the first predicted power consumption and the second predicted power consumption by use of the first machine learning model and the second machine learning model, which will not be detailed here.

In addition, those skilled in the art can understand that other different methods may also be used to predict the first predicted power consumption and the second predicted power consumption, which are not limited to the above-mentioned method of using machine learning models for the prediction.

Next, the error calculation step S106 is executed, wherein, based on the collected real-time power consumption data, the following processing is performed sequentially for each of the second time periods from the first second time period to the last second time period comprised in the first time period:

calculating a first error between the actual power consumption in the second time period and the second predicted power consumption of the second time period, and calculating a second error between the total actual power consumption from the first second time period to a current second time period and a sum of the second predicted power consumptions from the first second time period to the current second time period.

The error between the actual power consumption and the predicted power consumption is inevitable. Therefore, it is necessary to monitor the actual power consumption and the predicted power consumption in real time, and the error will also be tracked during monitoring. In the method of the present disclosure, the error is calculated for different time intervals for further monitoring.

Specifically, the method will be described still with one month as the first time period and one day as the second time period.

Starting from the first day of a month, the first error between the actual power consumption in each day and the second predicted power consumption of the day is calculated, and the second error between the total actual power consumption from the first day of the month to the current day of the month and the sum of the predicted power consumption of each day from the first day to the current day of the month is calculated.

For example, Eai represents the actual power consumption in the ith day of the month, Epi represents the predicted power consumption of the ith day of the month, E1i represents the first error of the ith day of the month, and E2j represents the calculated second error of the jth day of the month.

Then, the formula for calculating the first error of the ith day may be expressed as equation (1) below:

$$E1i = Eai - Epi \quad (1)$$

The formula for calculating the second error of the jth day may be expressed as equation (2) below:

$$E2j = (Ea1 + Ea2 + \ldots + Eaj) - (Ep1 + Ep2 + \ldots + Epj) \quad (2)$$

Starting from the first day of a month, E11, E21, E12, E22, ... are calculated successively until the last day of the month, for example, E130 and E230 (assuming there are 30 days in the month).

Real-time error tracking is possible through the calculation of the first error and the second error. By use of the results of error tracking, it is possible to trigger alarms based on different thresholds of the first error and the second error. The following adjustment step S108 is thus executed.

In step S108, when the first error is greater than the corresponding first threshold and/or the second error is greater than the corresponding second threshold, the power supply plan or the user's power demand is adjusted.

Here, the power supply plan may be adjusted, or the user's power demand may be adjusted, and it is possible to determine how to adjust (increase/reduce) it based on the sign and magnitude of the error. By proper adjustment, the difference between the actual demand and the predicted demand can be reduced.

In one example, the power management method 100 may further comprise a post-evaluation step S110, wherein a third error between the actual power consumption in the first time period and the first predicted power consumption is calculated after the first time period, and the first prediction model and the second prediction model used to predict respectively the first predicted power consumption and the second predicted power consumption are separately adjusted when the third error is greater than a third predetermined threshold.

When the first time period is one month, the third error is that between the actual power consumption of the user in one month and the predicted monthly power consumption.

Specifically, adjusting the prediction models may comprise, for example: re-training the first machine learning model and the second machine learning model by use of newly collected monthly power consumption data and daily power consumption data, etc., which will not be detailed here.

Those skilled in the art can respectively set the appropriate first predetermined threshold, second predetermined threshold, and third predetermined threshold based on experience, which will not be detailed here.

The above power management method can be performed on all the users in a power system to calculate the third error for each user, for example, the error between the actual power consumption of each user in one month and the predicted monthly power consumption, and then all the users in the power system can be ranked based on the calculated errors.

For example, the users may be ranked in the order from smaller errors to greater errors. Users with smaller errors have better power consumption. By means of this ranking, high-quality power users and the characteristics of different users can be easily identified, thereby improving the management of power users and increasing the efficiency of power consumption.

Figure 2:
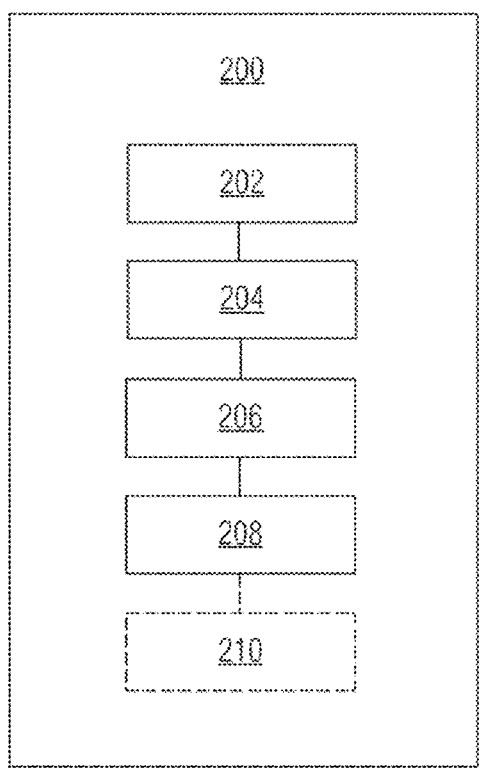
FIG. 2 is a block diagram of an exemplary configuration of the power management apparatus 200 according to one embodiment of the present disclosure.

FIG. 2 is a block diagram of an example configuration of the power management apparatus 200 according to one embodiment of the present disclosure.

As shown in FIG. 2, the power management apparatus 200 comprises: a monitoring unit 202, a prediction unit 204, an error calculation unit 206, and an adjustment unit 208.

Wherein, the monitoring unit 202 is configured to collect and store power consumption data of a user in real time.

The prediction unit 204 is configured to predict a first predicted power consumption of a first time period based on the collected power consumption data by use of a prestored first prediction model, and predict a second predicted power consumption of each second time period comprised in the first time period by use of a prestored second prediction model.

The error calculation unit 206 is configured to, based on the collected real-time power consumption data, perform the following processing sequentially for each of the second time periods from the first second time period to the last second time period comprised in the first time period:

calculating a first error between the actual power consumption in the second time period and the second predicted power consumption of the second time period, and calculating a second error between the total actual power consumption from the first second time period to a current second time period and a sum of the second predicted power consumptions from the first second time period to the current second time period.

The adjustment unit 208 is configured to adjust the power supply plan or the user's power demand when the first error is greater than the corresponding first threshold and/or the second error is greater than the corresponding second threshold.

In one embodiment, the power management apparatus 200 further comprises a post-evaluation unit 210, configured to calculate a third error between the actual power consumption in the first time period and the first predicted power consumption after the first time period, and separately adjust the first prediction model and the second prediction model when the third error is greater than a third predetermined threshold.

Wherein, the post-evaluation unit is further configured to: rank different users based on the third error calculated for the users.

Wherein, the first time period is one month, and the second time period is one day.

Wherein, the first prediction model is a first machine learning model obtained through training using historical power consumption data of the first time period as the training data; and the second prediction model is a second machine learning model obtained through training using historical power consumption data of the second time period as the training data.

The details of the operation and function of each part of the power management apparatus 200, for example, may be the same as or similar to those of relevant parts of the power management method in the embodiments of the present disclosure described with reference to FIG. 1, and will not be detailed here.

It should be noted that the power management apparatus 200 shown in FIG. 2 and the structure of the units thereof are only exemplary, and those skilled in the art can modify the structural black diagram shown in FIG. 2 as needed.

Figure 3:
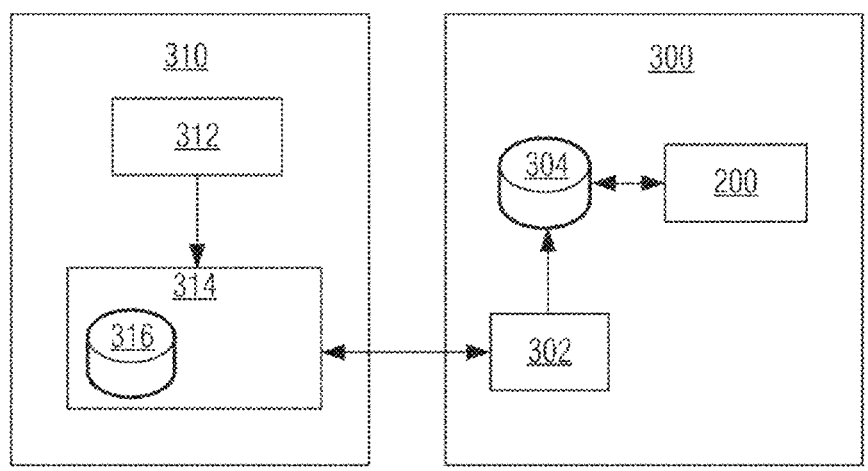
FIG. 3 is a block diagram of an exemplary configuration of the power management system 300 according to one embodiment of the present disclosure.

FIG. 3 is a block diagram of an exemplary configuration of the power management system 300 according to one embodiment of the present disclosure.

The power management system 300 may comprise an interface unit 302, a database 304 and a power management apparatus 200 described above.

The power management system 300 is interfaced with an external system 310 via the interface unit 302.

The external system 310 may be, for example, a power consumption data monitoring system of the power company. The external system may comprise, for example, a measuring system 312 and a local server 314. The measuring system 312 is used to collect the power consumption data of each user in real time, and then send the collected power consumption data to the local server 314, and the power consumption data may be stored in a local database 316 of the server 314.

The interface unit 302 may be, for example, a Jar package. The power management system 300 requests power consumption data from the external system 310 through the interface unit 302, and exports the obtained data to the database 304.

The power management device 200 according to the present disclosure can obtain power consumption data from the database 304 and perform power management operations.

Wherein, the monitoring unit, error calculation unit, and post-evaluation unit comprised in the power management device 200 may be implemented as Web applications, which may comprise a back end and a front end. The prediction unit used to predict power consumption may be implemented in a data analysis module. The database may be shared between the web application and the data analysis module.

In the method and apparatus according to one embodiment of the present disclosure, prediction is an important technique. Prediction is performed on the full time scale. For example, not only daily power consumption but also monthly power consumption is predicted. As mentioned above, there are usually some bottlenecks in the prediction accuracy in prior art. In the method and apparatus of the present disclosure, the prediction accuracy can be improved by use of the full time-scale prediction.

Error tracking may be performed to reduce the error between the actual power consumption and the predicted power consumption. When an unacceptable error occurs at a monitoring point based on certain critical time points, an alarm can be sent to adjust the power supply plan or adjust the user's power demand.

The method, apparatus and system according to one embodiment of the present disclosure can improve the accuracy of prediction, enhance the management of power consumption, and thus increase the efficiency of power consumption.

The method, apparatus and system according to one embodiment of the present disclosure can lower costs for power sales companies and plants, and moreover can optimize the calculation of power supply and reduce the management cost due to large differences between predicted power consumption and the actual power consumption.

The method, apparatus and system for power management according to the present disclosure are described above with reference to FIGS. 1 to 3. The power management apparatus above may be implemented as hardware or software or a combination thereof.

Figure 4:
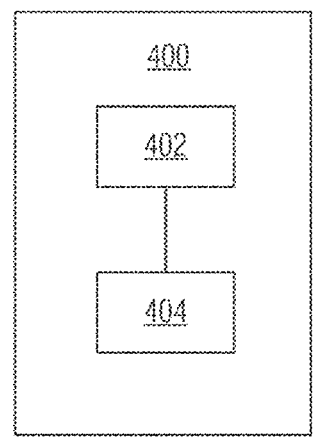
FIG. 4 is a block diagram of the computing device for power management according to one embodiment of the present disclosure.

In the present disclosure, the power management apparatus 200 may be implemented as a computing device. FIG. 4 is a block diagram of the computing device 400 for power management according to the embodiments of the present disclosure. According to one embodiment, the computing device 400 may comprise at least one processor 402, and the processor 402 executes at least one computer-readable instruction (i.e., an element implemented in the form of software as described above) stored or encoded in a computer-readable storage medium (i.e., the memory 404).

According to one embodiment, a computer-executable instruction is stored in the memory 404, which, when executed, causes the at least one processor 402 to complete the following action: collecting and storing power consumption data of a user in real time; predicting first predicted power consumption of a first time period based on the collected power consumption data using a prestored first prediction model, and predicting, using a prestored second prediction model, second predicted power consumption of each second time period comprised in the first time period; sequentially performing, based on the collected real-time power consumption data, the following processing for each second time period from a first second time period to a last second time period comprised in the first time period: calculating a first error between the actual power consumption in the second time period and the second predicted power consumption of the second time period, and calculating a second error between the total actual power consumption from the first second time period to a current second time period and a sum of the second predicted power consumptions from the first second time period to the current second time period; and adjusting a power supply plan or a power demand of the user when the first error is greater than a first predetermined threshold and/or the second error is greater than a second predetermined threshold.

It should be understood that the computer-executable instruction stored in the memory 404, when executed, causes the at least one processor 402 to perform the various operations and functions in each embodiment of the present disclosure described above with reference to FIGS. 1 to 3.

According to one embodiment, a non-transitory machine-readable medium is provided. The non-transitory machine-readable medium may have a machine-executable instruction (i.e., element implemented in the form of software as described above) that, when executed by a machine, causes the machine to execute the various operations and functions in each of the embodiments of the present disclosure described above with reference to FIGS. 1 to 3.

According to one embodiment, a computer program product is provided, comprising a computer-executable instruction, which, when executed, causes at least one processor to perform the various operations and functions described above in each of the embodiments of the present disclosure with reference to FIGS. 1 to 3.

The exemplary embodiments described above for specific implementations with reference to the drawings are not all the embodiments that can be implemented or fall within the scope of the claims. The term "exemplary" used throughout this description means "serving as an example, instance, or illustration", and does not mean "preferred to" or "advantageous over" other embodiments. For the purpose of providing an understanding of the described techniques, the specific implementations comprise specific details. However, these techniques can be implemented without these specific details. In some examples, in order to avoid incomprehensibility of the concepts of the described embodiments, structures and devices in the general common knowledge are shown in the form of block diagrams.

The foregoing description of the present disclosure is provided to enable anyone ordinarily skilled in the art to implement or use the present disclosure. For those ordinarily skilled in the art, various modifications to the present disclosure are obvious, and the general principles defined herein can also be applied to other modifications without departing from the scope of the present disclosure. Therefore, the present disclosure is not limited to the examples and designs described herein, but is consistent with the widest scope that conforms to the principles and novel features disclosed herein.

What is claimed is:

1. A power management method, comprising:
    a monitoring step including collecting and storing power consumption data of a user in real time;
    a prediction step including predicting first predicted power consumption of a first time period based on the collected power consumption data using a prestored first prediction model, and predicting, using a prestored second prediction model, second predicted power consumption of each second time period the first time period;
    an error calculation step including sequentially performing, based on the collected real-time power consumption data, for each second time period from a first second time period to a last second time period in the first time period,
        calculating a first error between actual power consumption of the second time period and the second predicted power consumption of the second time period, and
        calculating a second error between total actual power consumption from the first second time period to a current second time period and a sum of second predicted power consumption from the first second time period to the current second time period; and
    an adjustment step including adjusting a power supply plan or a power requirement of the user when at least one of (1) the first error is greater than a first predetermined threshold or (2) the second error is greater than a second predetermined threshold.

2. The power management method according to claim 1, further comprising:
    a post-evaluation step including calculating a third error between actual power consumption of the first time period and the first predicted power consumption after the first time period ends, and separately adjusting the first prediction model and the second prediction model when the third error is greater than a third predetermined threshold.

3. The power management method according to claim 2, wherein the post-evaluation step further comprises:
    ranking different users based on the third error calculated for the users.

4. The power management method according to claim 3, wherein the first time period is one month, and the second time period is one day.

5. The power management method according to claim 3, wherein the first prediction model is a first machine learning model obtained by training using power consumption historical data of the first time period as training data, and the second prediction model is a second machine learning model obtained by training using power consumption historical data of the second time period as training data.

6. The power management method according to claim 2, wherein the first time period is one month, and the second time period is one day.

7. The power management method according to claim 2, wherein the first prediction model is a first machine learning model obtained by training using power consumption historical data of the first time period as training data, and the second prediction model is a second machine learning model obtained by training using power consumption historical data of the second time period as training data.

8. The power management method according to claim 1, wherein the first time period is one month, and the second time period is one day.

9. The power management method according to claim 1, wherein the first prediction model is a first machine learning model obtained by training using power consumption historical data of the first time period as training data, and the second prediction model is a second machine learning model obtained by training using power consumption historical data of the second time period as training data.

10. A computing device, comprising:
   at least one processor; and
   a memory coupled to the at least one processor, the memory being configured to store an instruction that, when executed by the at least one processor, causes the processor to perform the method according to claim 1.

11. A non-transitory machine readable storage medium storing an executable instruction that, when executed, causes a machine to perform the method according to claim 1.

12. A power management apparatus, comprising:
   a processor coupled to a memory to implement,
      a monitoring unit configured to collect and store power consumption data of a user in real time;
      a prediction unit configured to predict first predicted power consumption of a first time period based on the collected power consumption data using a prestored first prediction model, and predict, using a prestored second prediction model, second predicted power consumption of each second time period in the first time period;
      an error calculation unit configured to sequentially perform, based on the collected real-time power consumption data, the following processing from a first second time period to a last second time period in the first time period:
         calculating a first error between actual power consumption of the second time period and the second predicted power consumption of the second time period, and calculating a second error between total actual power consumption from the first second time period to a current second time period and a sum of second predicted power consumption from the first second time period to the current second time period; and
      an adjustment unit configured to adjust a power supply plan or a power requirement of the user when at least one of (1) the first error is greater than a first predetermined threshold or (2) the second error is greater than a second predetermined threshold.

13. The power management apparatus according to claim 12, further comprising:
   a post-evaluation unit configured to calculate a third error between actual power consumption of the first time period and the first predicted power consumption after the first time period ends, and separately adjust the first prediction model and the second prediction model when the third error is greater than a third predetermined threshold.

14. The power management apparatus according to claim 13, wherein the post-evaluation unit is further configured to:
   rank different users based on the third error calculated for the users.

15. The power management apparatus according to claim 13, wherein the first time period is one month, and the second time period is one day.

16. The power management apparatus according to claim 13, wherein the first prediction model is a first machine learning model obtained through training using power consumption historical data of the first time period as training data, and the second prediction model is a second machine learning model obtained through training using power consumption historical data of the second time period as training data.

17. The power management apparatus according to claim 12, wherein the first time period is one month, and the second time period is one day.

18. The power management apparatus according to claim 12, wherein the first prediction model is a first machine learning model obtained through training using power consumption historical data of the first time period as training data, and the second prediction model is a second machine learning model obtained through training using power consumption historical data of the second time period as training data.

19. A power management system comprising:
   an interface unit configured to enable the power management system to obtain power consumption data from an external system;
   a database configured to store the power consumption data; and
   the power management apparatus according to claim 12, wherein
      the power management apparatus obtains the power consumption data from the database.

* * * * *